(12) United States Patent
Hwang (10) Patent No.: US 11,872,975 B2
(45) Date of Patent: Jan. 16, 2024

(54) ELECTROHYDRAULIC BRAKE SYSTEM

(71) Applicant: HYUNDAI MOBIS CO., LTD., Seoul (KR)

(72) Inventor: Woo Hyun Hwang, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 332 days.

(21) Appl. No.: 17/330,461

(22) Filed: May 26, 2021

(65) Prior Publication Data

US 2021/0370899 A1 Dec. 2, 2021

(30) Foreign Application Priority Data

Jun. 1, 2020 (KR) .................. 10-2020-0065727

(51) Int. Cl.
*B60T 7/12* (2006.01)
*B60T 8/92* (2006.01)
(Continued)

(52) U.S. Cl.
CPC .............. *B60T 8/92* (2013.01); *B60L 7/26* (2013.01); *B60T 8/171* (2013.01); *B60T 8/176* (2013.01);
(Continued)

(58) Field of Classification Search
CPC ........... B60T 8/92; B60T 8/171; B60T 8/176; B60T 2270/602; B60T 2270/604;
(Continued)

(56) References Cited

U.S. PATENT DOCUMENTS

| 5,249,641 A | 10/1993 | Sakata |
| 5,676,434 A | 10/1997 | Ichikawa |

(Continued)

FOREIGN PATENT DOCUMENTS

| CN | 108778864 A | 11/2018 |
| CN | 109229081 A | 1/2019 |

(Continued)

OTHER PUBLICATIONS

German Office Action dated Nov. 23, 2022 in corresponding German Patent Application No. 102021113905.8.
(Continued)

*Primary Examiner* — Shardul D Patel
(74) *Attorney, Agent, or Firm* — NovoTechIP International PLLC (57) ABSTRACT

According to at least one embodiment, the present disclosure provides an electrohydraulic brake system including main brake assemblies, electronic parking brakes (EPBs), a main control unit, and a redundancy control unit (RCU). The main brake assemblies generate a braking force in one or more front wheels and one or more rear wheels of a vehicle. The electronic parking brakes (EPBs) generate a braking force to one of the front wheels and rear wheels. The main control unit is configured to control the operation of the main brake assembly. The redundancy control unit (RCU) is configured to control the operation of the electronic parking brake. Here, the redundancy control unit performs, upon determining that a malfunction occurs in a braking function of the main control unit, a slip control on the vehicle by using the electronic parking brake based on signals from one or more wheel speed sensors.

10 Claims, 4 Drawing Sheets

(51) Int. Cl.
  *B60T 8/171* (2006.01)
  *B60T 8/176* (2006.01)
  *B60L 7/26* (2006.01)
  *B60L 15/20* (2006.01)

(52) U.S. Cl.
  CPC ..... *B60L 15/2009* (2013.01); *B60T 2270/602* (2013.01); *B60T 2270/604* (2013.01)

(58) Field of Classification Search
  CPC ........... B60T 8/17616; B60T 2270/402; B60T 8/321; B60T 13/662; B60T 1/10; B60T 13/586; B60T 17/22; B60T 2270/413; B60T 17/221; B60T 8/172; B60T 8/329; B60T 2270/60; B60T 7/12; B60L 7/26; B60L 15/2009; B60L 2240/16; B60L 2240/465; B60L 2250/10; B60L 2250/26; B60L 3/0038; B60L 3/0076; B60L 3/0092; B60L 3/10; B60L 3/102; B60L 3/108; B60L 7/18; F16D 61/00; B60Y 2306/15; B60Y 2400/3032
  USPC .......................................................... 701/76
  See application file for complete search history.

(56) References Cited

U.S. PATENT DOCUMENTS

| | | | | |
|---|---|---|---|---|
| 2013/0253793 | A1* | 9/2013 | Lee | B60W 50/029 701/70 |
| 2014/0015310 | A1* | 1/2014 | Hanzawa | B60T 17/22 303/3 |
| 2015/0115697 | A1* | 4/2015 | Yamamoto | B60T 13/745 303/3 |
| 2016/0114779 | A1* | 4/2016 | Binder | B60T 8/171 701/76 |
| 2017/0174194 | A1 | 6/2017 | Baumgaertner et al. | |
| 2020/0156601 | A1* | 5/2020 | Goers | B60T 13/662 |
| 2020/0198609 | A1* | 6/2020 | Nemeth | B60T 7/045 |
| 2021/0009095 | A1* | 1/2021 | Kim | B60T 1/10 |
| 2021/0031741 | A1* | 2/2021 | Alford | B60T 13/662 |
| 2021/0339725 | A1* | 11/2021 | Adler | B60T 17/18 |
| 2021/0347346 | A1* | 11/2021 | Adler | B60T 13/36 |
| 2022/0090679 | A1* | 3/2022 | Berndaner | B60T 7/085 |

FOREIGN PATENT DOCUMENTS

| | | |
|---|---|---|
| CN | 110525409 A | 12/2019 |
| DE | 60003310 T2 | 4/2004 |
| DE | 102017008948 A1 | 3/2019 |
| DE | 112020006108 T5 | 11/2022 |
| JP | 62221923 A | 9/1987 |
| JP | 2009166656 A | 7/2009 |

OTHER PUBLICATIONS

Chinese Office Action dated Apr. 24, 2023 Issued in corresponding Chinese Application No. 202110608772.3.

* cited by examiner

ELECTROHYDRAULIC BRAKE SYSTEM

CROSS-REFERENCE TO RELATED APPLICATIONS

This application is based on, and claims priority from, Korean Patent Application Number 10-2020-0065727, filed Jun. 1, 2020, the disclosure of which is incorporated by reference herein in its entirety.

TECHNICAL FIELD

The present disclosure in at least one embodiment relates to an electrohydraulic brake system.

BACKGROUND

The statements in this section merely provide background information related to the present disclosure and do not necessarily constitute prior art.

An electronic parking brake (EPB) provides the straightforward function of keeping a vehicle stopped during parking as well as a variety of additional functions for improving the convenience of the driver and stability of driving. One of these additional functions is the dynamic braking function for braking the vehicle while driving. Dynamic braking is a function that allows the driver to use the electronic parking brake as an emergency braking device when an abnormality occurs in the hydraulic brake installed in the vehicle.

A conventional electronic brake system is provided with a redundancy brake system for providing auxiliary backup braking force in case of abnormal operation of the main brake assembly. However, during backup braking, hydraulic control is performed on the front wheels but not on the rear wheels. The related prior art includes Korean Patent Registration No. 10-1294126 'regenerative braking system'. Here, the logic behind performing hydraulic control only on the front wheels during backup braking is to increase the amount of energy recovery by increasing the proportion of regenerative braking. However, braking the front wheels alone during backup braking involves deteriorations in the braking force and stability of the vehicle, which is disadvantageous. Moreover, a wheel slip occurring during backup braking can be the cause of an accident, resulting in some bad damage.

Therefore, it is necessary to secure the stability of the vehicle through the braking force and slip control of the rear wheels by utilizing the dynamic braking function of the electronic parking brake during backup braking.

Additionally, even with the dynamic braking function used, there is a need to secure the efficiency of braking by supplementing the insufficient braking force with the regenerative brake force.

SUMMARY

According to at least one embodiment, the present disclosure provides an electrohydraulic brake system including one or more main brake assemblies, one or more electronic parking brakes (EPBs), a main control unit, and a redundancy control unit (RCU). The main brake assemblies are configured to generate a braking force in one or more front wheels and one or more rear wheels of a vehicle. The electronic parking brakes (EPBs) are configured to generate a braking force to one of the front wheels and the rear wheels. The main control unit is configured to control the operation of each of the main brake assemblies. The redundancy control unit (RCU) is configured to control the operation of the electronic parking brake. Here, the redundancy control unit performs, upon determining that a malfunction occurs in a braking function of the main control unit, a slip control on the vehicle by using the electronic parking brakes based on signals from one or more wheel speed sensors.

DETAILED DESCRIPTION

The present disclosure in at least one embodiment seeks to provide the vehicle with a redundancy control unit responsive to a backup braking event in a high$\mu$ state incurring no wheel slippage for using hydraulic pressure on the front wheels to secure 0.8 g (gravity acceleration) of braking power, and responsive to more braking power demand, for employing the slow ramp up (SRU) function of the electronic parking brake to provide additional rear-wheel braking force, thereby braking the vehicle safely.

The present disclosure in at least one embodiment further seeks to provide the vehicle with the redundancy control unit responsive to a low$\mu$ state susceptible to wheel slippage for employing the real wheel unlocker (RWU) function of the electronic parking brake on the rear wheels to provide a rear-wheel slip control, thereby braking the vehicle safely.

The present disclosure in at least one embodiment further seeks to employ the regenerative braking function for adding supplementary braking force in response to a shortage of braking force, thereby achieving an efficient vehicle braking.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

Figure 1:
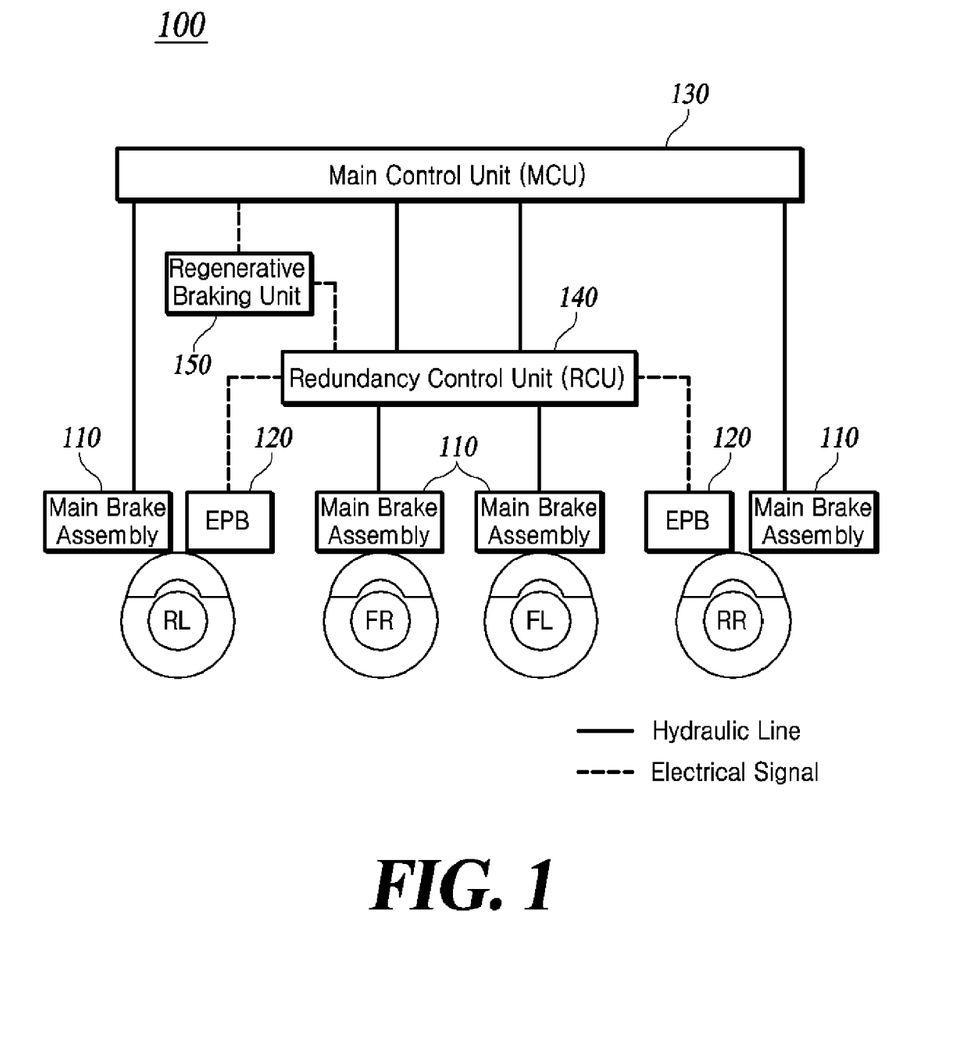
FIG. 1 is a block diagram of an electrohydraulic brake system according to at least one embodiment of the present disclosure.

FIG. 1 is a block diagram of an electrohydraulic brake system according to at least one embodiment of the present disclosure.

As shown in FIG. 1, an electrohydraulic brake system 100 according to at least one embodiment of the present disclosure includes all or some of the main brake assemblies 110, electronic parking brakes (EPBs) 120, the main control unit 130, a secondary or redundancy control unit (RCU) 140, a regenerative braking unit 150, wheel speed sensors (not shown), and an acceleration sensor (not shown).

The main brake assemblies 110 are each a device for transmitting a braking force to vehicle wheels by using hydraulic pressure. The main brake assemblies 110 brake the front and rear wheels with hydraulic pressure generated from a hydraulic brake unit (not shown) according to a signal from the main control unit 130. With the hydraulic pressure generated from the hydraulic brake unit, the main brake assemblies 110 brake the front wheels according to a signal from the redundancy control unit 140.

The electronic parking brakes (EPBs) 120 are devices for transmitting a braking force to the rear wheels according to the signal of the redundancy control unit 140. The electronic parking brakes 120 are provided advantageously on the rear wheels exclusively for the latter to receive the transmitted braking force saving the need to install electronic parking brakes 120 on the front wheels, thereby reducing the cost therefor. The limited arrangement of the electronic parking brakes 120 on the rear wheels obviates the need for providing the redundancy control unit 140 with output terminals for controlling front-wheel electronic parking brakes, which is also advantageous in terms of securing space. However, it should be noted that the present disclosure is not limited to this configuration but encompasses the opposite thereto, that is, a case where the electronic parking brakes 120 are provided on the front wheels exclusively.

The main control unit 130 may be an electronic control unit of an anti-lock brake system (ABS), electronic stability control (ESC) system, a conventional brake system (CBS), or other such hydraulic braking systems.

The ABS prevents the slip of the wheel during the braking of the vehicle to prevent losing the driver's control and the wheel from being locked during braking and thereby shorten the braking distance.

The ESC system is a device for optimally controlling the vehicle driving attitude, which enhances the driving stability of the vehicle that is about to slide on dry road surfaces, rainy roads, gravel roads, snowy roads, etc. by independently controlling the drive wheels instantaneously to maintain the vehicle stability.

The CBS is a mechanical brake system for braking by directly transmitting the hydraulic pressure generated in the hydraulic braking unit (not shown) to the main brake assemblies 110 bypassing an electronic control device.

Meanwhile, the main control unit 130 may generate a regenerative braking signal and transmit the same to the regenerative braking unit 150.

The redundancy control unit 140 has the function of controlling the electronic parking brakes 120 in addition to the function of the main control unit 130. The redundancy control unit 140 is connected through signal lines to the electronic parking brakes 120 in charge of braking the rear wheels.

The redundancy control unit 140 is a redundancy system that accessorily controls the braking of the vehicle upon receiving, from the main control unit 130, information on a malfunction of the main control unit 130. The redundancy control unit 140 further includes a rear wheel unlocker (RWU) function and a slow ramp up (SRU) function in addition to the ABS, ESC system, and CBS.

The rear wheel unlocker (RWU) function generates braking force by using the electronic parking brake 120 in a situation where normal braking force cannot be generated during vehicle driving. The RWU function utilizes the difference between the respective wheel speeds measured by wheel speed sensors (not shown) of the front wheels and wheel speed sensors (not shown) of the rear wheels to determine whether a slip has occurred in the wheels. Here, slip refers to a phenomenon in which the driving wheel is idle because the driving force exceeds the adhesion force between the tire and the road surface.

The redundancy control unit 140 determines whether a slip has occurred in the vehicle by utilizing the measured values by the front wheel speed sensors as a basis for comparison with the measured values by the rear wheel speed sensors. At this time, the redundancy control unit 140 is responsive to when the wheel speeds of the rear wheels are greater than those of the front wheel for determining that the driving force exceeds the adhesive force between the tire and the road surface, and thus the driving wheel is idle. In other words, the redundancy control unit 140 determines whether a slip has occurred in the vehicle based on the wheel speeds of the front wheels.

When slip occurs, the redundancy braking control unit 140 performs a slip control on the rear wheels by using the electronic parking brakes 120. Here, the slip control is responsive to when wheel slip occurs due to a small friction coefficient of the road surface during vehicle control for temporarily reducing the rear wheel braking force, similar to ABS control, to ensure vehicle stability, and it is responsive to when the wheel slip disappears for reinstating the braking force in the rear wheels.

The slow ramp up (SRU) function engages when all or some of the wheel speed sensors malfunction, that is, in the event of failed slip control by using the wheel speeds. The SRU function gradually increases the braking force of the electronic parking brakes 120 for braking the rear wheels with no information received from the wheel speed sensors. The SRU function needs information from an acceleration sensor (not shown) to determine whether the vehicle is decelerating as the braking force of the electronic parking brakes 120 increases. Using the information from the acceleration sensor, a determination is made on whether the vehicle is being braked and decelerated by the electronic parking brakes 120.

When the vehicle is not decelerated according to the value measured by the acceleration sensor, the redundancy control unit 140 increases the braking force of the electronic parking brakes 120. On the other hand, when the vehicle is decelerating, the braking force of the electronic parking brakes 120 is adjusted appropriately to the braking situation. Since the SRU function uses an acceleration sensor, it can operate regardless of a malfunction of the wheel speed sensors.

Meanwhile, the redundancy control unit 140 may work like the main control unit 130 to generate and transmit a regenerative braking signal to the regenerative braking unit 150.

The regenerative braking unit 150 may include all or some of a battery (not shown) for storing energy due to the counter-electromotive force generated from an electric motor (not shown) during regenerative braking, the electric motor that performs the regenerative braking by using the inertial force of the vehicle to maintain the straight motion during the braking of the vehicle, and a hybrid control unit (HCU, not shown) for controlling to perform regenerative braking by calculating the regenerative brake force that can be provided to the vehicle by the regenerative braking.

Regenerative braking refers to driving a motor as a generator by using the driving inertia of a vehicle and using a resistance generated by driving the motor as a braking force. Additionally, the regenerative braking unit 150 may supply electric power to the electric motor when the vehicle is running. The regenerative braking unit 150 drives the electric motor in response to a regenerative braking signal generated by the main control unit 130 and the redundancy control unit 140 and thereby generates a regenerative brake force. Therefore, during braking, the regenerative braking unit 150 and a hydraulic braking unit (not shown) cooperate to perform braking, which supplies a stable braking force to the vehicle.

The wheel speed sensors (not shown) are provided on the multiple wheels. The wheel speed sensors measure the wheel speeds. The wheel speed sensors may be provided on the front and rear wheels, respectively. The wheel speed sensors measure the wheel speeds of the front wheels FR, FL and the rear wheels RR, RL, respectively. The measured wheel speeds are transmitted to the main control unit 130 and the redundancy control unit 140.

The acceleration sensor (not shown) is a device that measures whether the vehicle is decelerated by braking by the electronic parking brakes 120. The measured acceleration of the vehicle is transmitted to the main control unit 130 and the redundancy control unit 140.

Figure 2:
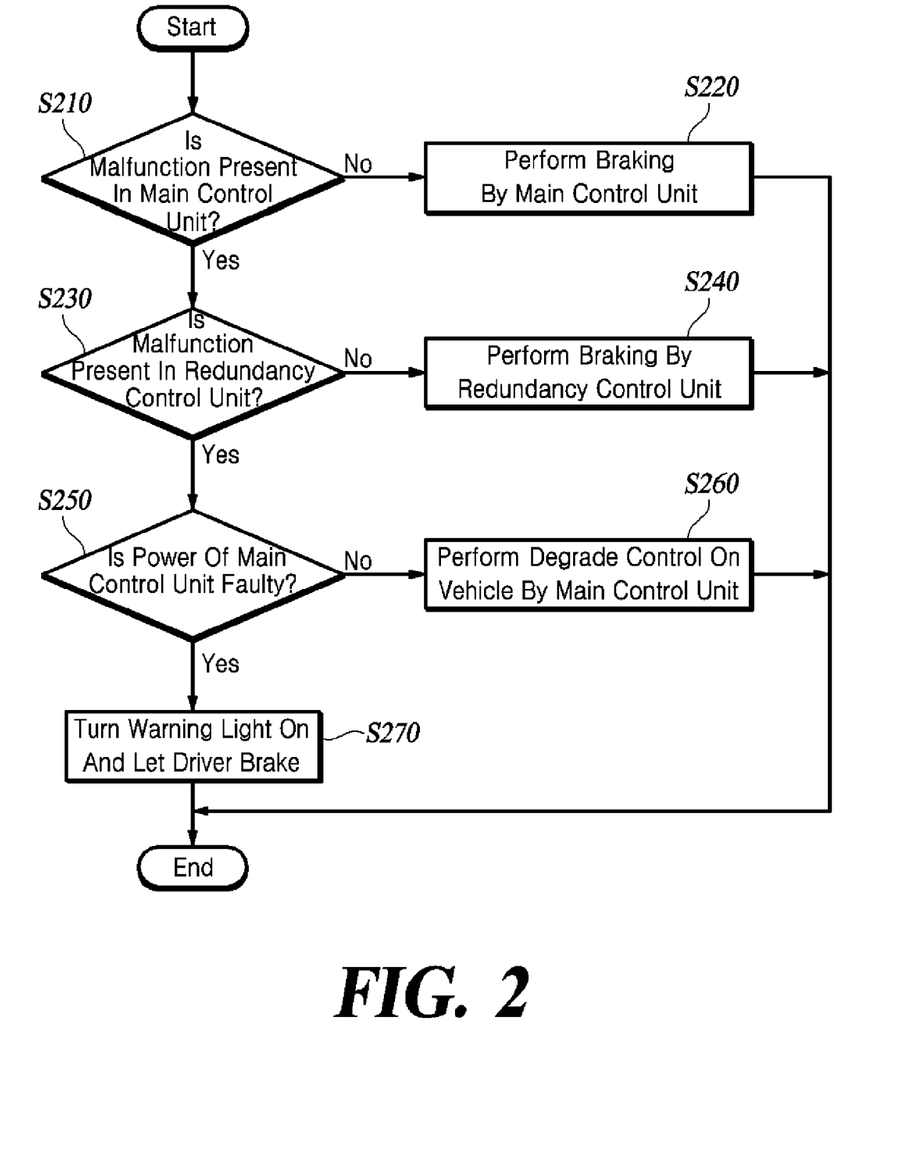
FIG. 2 is a flowchart of a braking method for an electrohydraulic brake system, according to at least one embodiment of the present disclosure.

FIG. 2 is a flowchart of a braking method for an electrohydraulic brake system, according to at least one embodiment of the present disclosure.

In response to a braking request of the driver, a determination is made on whether an abnormality is present in the correct braking function of the main control unit 130 by using a sensor of the main control unit 130 (S210).

Upon determining that the main control unit 130 is normal, the vehicle is braked by the main control unit 130 (S220). The main control unit 130 transmits braking force to the front and rear wheels by using the regenerative brake force of the regenerative braking unit 150 as well as the hydraulic brake force of the hydraulic braking unit.

When an abnormality is determined to be present in the main control unit 130, a determination is made on whether an abnormality is present in the ordinary braking function of the redundancy control unit 140 by using a sensor of the redundancy control unit 140 (S230).

Upon determining that the redundancy control unit 140 is normal, the vehicle is braked by the redundancy control unit 140 (S240). The redundancy control unit 140 transmits the braking force to the front and rear wheels with the regenerative brake force from the regenerative braking unit 150 as well as the hydraulic pressure of the hydraulic braking unit and additionally transmits the braking force of the electronic parking brakes 120 to the rear wheels.

When both the main control unit 130 and the redundancy control unit 140 are determined to be abnormal, a determination is made on whether the power function of the main control unit 130 is faulty by using the sensor of the main control unit 130 (S250).

Upon determining that the power of the main control unit 130 is normal, the vehicle is subject to a degrade control of the main control unit 130 (S260). Here, the degrade control refers to a control method using only a partial braking function, but not the whole braking function due to the malfunction of the main control unit 130. Since only partial braking function is used during degrade control, the braking performance is lower than when the main control unit 130 is normal.

On the other hand, upon determining that the power of the main control unit 130 is faulty, a warning light is turned on informing the driver of the inability of the main control unit 130 and the redundancy control unit 140 to perform the normal braking function (S270). In this case, the vehicle is braked by the driver depressing the brake pedal.

Figure 3:
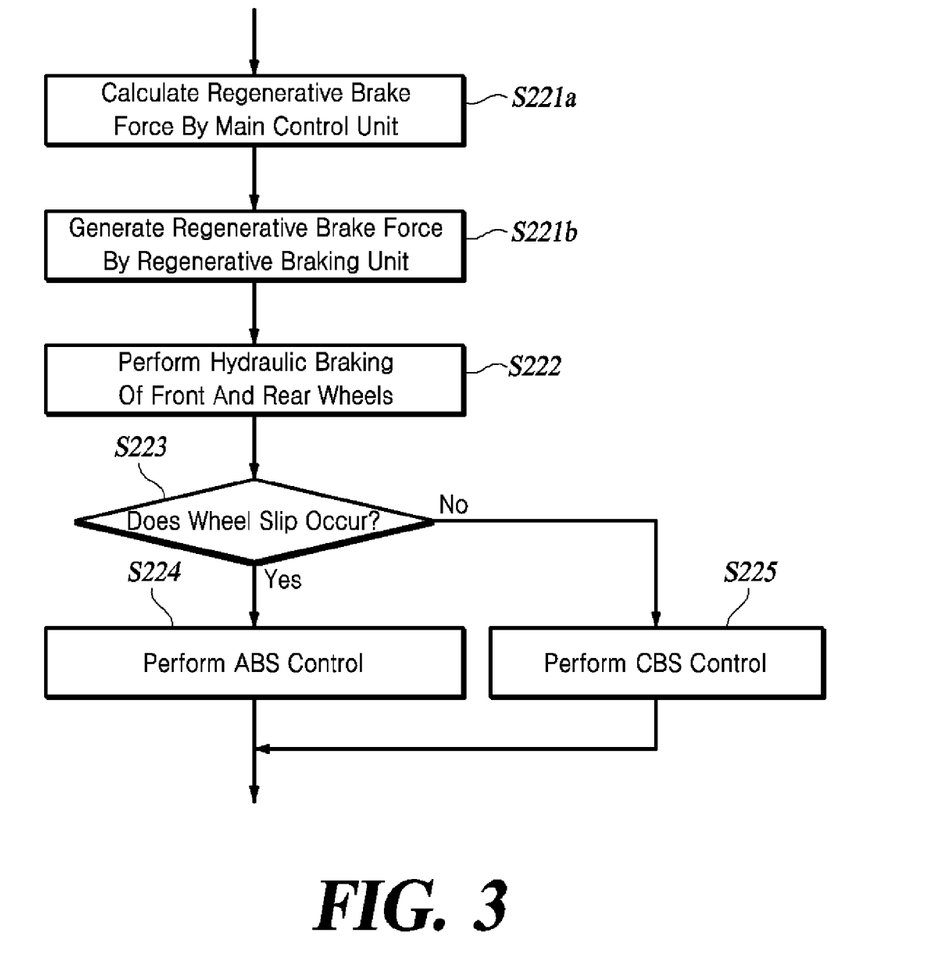
FIG. 3 is a flowchart illustrating Step S220 of FIG. 2 in detail.

FIG. 3 is a flowchart for illustrating Step S220 of FIG. 2 in detail.

Upon determining that the main control unit 130 is normal, the main control unit 130 calculates a regenerative brake force required for the braking of the vehicle (S221a). Here, the regenerative brake force refers to a braking torque generated by the regenerative braking unit 150. Meanwhile, a hydraulic brake force refers to a braking torque generated by the hydraulic brake unit.

The main control unit 130 transmits a regenerative braking signal to the regenerative braking unit 150, and accordingly, the regenerative braking unit 150 generates a regenerative brake force corresponding to the regenerative braking signal (S221b).

The main control unit 130 brakes the front and rear wheels of the vehicle by appropriately utilizing the regenerative brake force of the regenerative braking unit 150 as well as the hydraulic brake force of the hydraulic braking unit (S222).

The main control unit 130 determines whether a slip has occurred in the wheel (S223). Whether slip occurs is determined by calculating the difference between the rotational speeds of the front wheels and rear wheels measured by the wheel speed sensors of the wheels, respectively. When slip occurs, the driving wheel is idle, resulting in a difference in the rotational speed between the front wheels and rear wheels. Accordingly, the main controller 130 may determine whether the wheel slips from the difference between the wheel speeds measured by the wheel speed sensors of the front wheels and the rear wheels.

Upon determining that slip occurs in the wheel, the main control unit 130 uses the ABS function to prevent the wheel from being locked during braking, thereby preventing the vehicle from slipping and controlling not to lose the driver's maneuver (S224).

Upon determining that no slip occurs in the wheel, the main control unit 130 transmits the hydraulic pressure generated in the hydraulic brake system to the main brake assemblies 110 by using the CBS function to brake the front wheels and the rear wheels (S225).

Eventually, the main control unit 130 brakes the front and rear wheels through ABS or CBS control according to the braking request of the driver.

Figure 4:
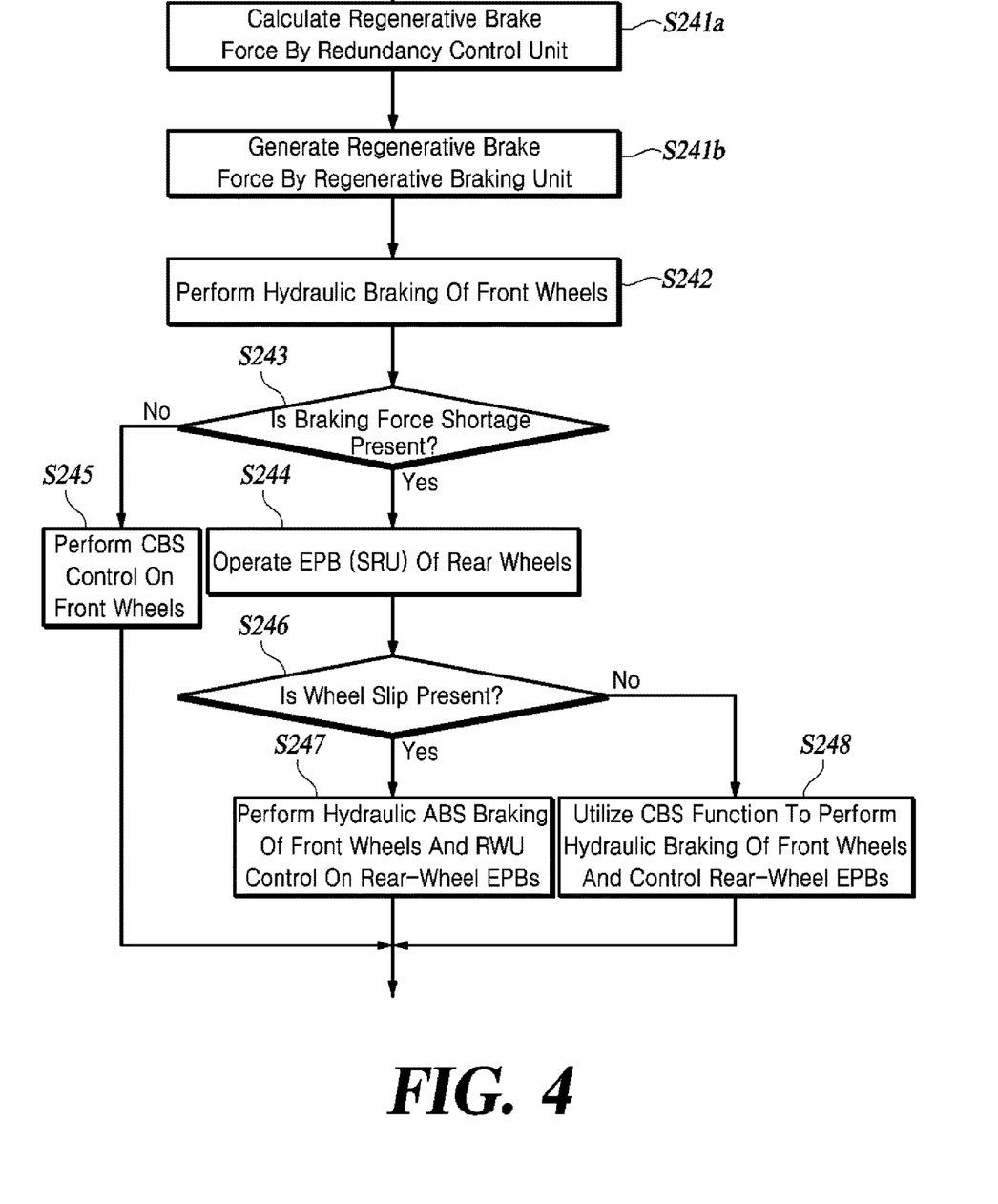
FIG. 4 is a flowchart illustrating Step S240 of FIG. 2 in detail.

FIG. 4 is a flowchart illustrating Step S240 of FIG. 2 in detail.

Upon determining that the redundancy control unit 140 is normal in Step S230, the redundancy control unit 140 calculates a regenerative brake force required for the braking of the vehicle (S241a).

The redundancy control unit 140 transmits a regenerative braking signal to the regenerative braking unit 150, and accordingly, the regenerative braking unit 150 generates a regenerative brake force corresponding to the regenerative braking signal (S241b).

The redundancy control unit 140 brakes the front wheels of the vehicle by appropriately utilizing the regenerative brake force from the regenerative braking unit 150 and the hydraulic brake force from the hydraulic braking unit (S242).

At this time, the redundancy control unit 140 secures a braking force of 0.8 g (g is gravitational acceleration) by using the hydraulic control on the front wheels and determines whether an additional braking force is needed (S243). In this case, the redundancy control unit 140 determines whether the vehicle is decelerating depending on the acceleration measured by the acceleration sensor and determines whether or not more braking force is required.

Upon determining that more braking force is needed, the redundancy control unit 140 controls the electronic parking brakes 120 to add braking force by the rear wheels. Here, the redundancy control unit 140 controls the electronic parking brakes 120 by using the slow ramp up (SRU) function (S244).

Upon determining that no further braking force is needed, the redundancy control unit 140 transmits the hydraulic pressure generated according to the conventional brake system (CBS) by the hydraulic braking system to the main brake assembly 110 and thereby brakes the front and rear wheels (S245).

After Step S244, the redundancy control unit 140 calculates the difference between the rotational speeds of the front wheels and those of the rear wheels measured by the wheel speed sensors of the wheels to determine whether a slip occurs in the wheel (S246). When slip occurs, the driving wheel is idle, resulting in a difference in rotational speed between the front wheels and rear wheels. Accordingly, the redundancy control unit 140 may determine whether the wheel slips from the difference between the wheel speeds measured by the front wheel speed sensors and the rear wheel speed sensors.

Upon determining that slip occurs in the wheel, the redundancy control unit 140 uses the ABS function to prevent the front wheels from being locked during braking, thereby preventing the vehicle from slipping and performing braking not to lose the driver's maneuver. Meanwhile, the rear wheels slip-control the electronic parking brakes by using the rear wheel unlocker (RWU) function (S247).

Upon determining that no slip occurs in the wheel in step S246, the redundancy control unit 140 utilizes the CBS function for transmitting the hydraulic pressure generated by the hydraulic brake system to the main brake assembly 110 and thereby braking the front wheels and for controlling the electronic parking brake 120 and thereby controlling the rear wheels (S248).

As described above, the present disclosure in some embodiments provides the vehicle with the redundancy control unit responsive to a malfunction of the main control unit for employing the slow ramp up (SRU) function to secure the rear-wheel braking force and thus the stability of the vehicle.

Additionally, the present disclosure in at least one embodiment employs the real wheel unlocker (RWU) function in response to wheel slippage occurring in the vehicle wheels during rear-wheel braking and thereby securing the stability of the vehicle.

Further, the present disclosure in at least one embodiment employs the regenerative braking function for adding supplementary braking force in response to a shortage of braking force even with the dynamic braking function used and thereby achieving an efficient vehicle braking.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof

What is claimed is:

1. An electrohydraulic brake system for a vehicle comprising a plurality of wheels and a wheel speed sensor, the plurality of wheels divided into (1) a first wheel group having one or more front wheels of the vehicle and (2) a second wheel group having one or more rear wheels of the vehicle, the electrohydraulic brake system comprising:
   one or more main brake assemblies configured to generate a first braking force for the wheels of the first and second wheel groups;
   one or more electronic parking brakes configured to generate a second braking force for the wheels of one of the first and second wheel groups;
   a main control unit configured to control the one or more main brake assemblies;
   a redundancy control unit configured to, in response to detecting that a malfunction has occurs to a braking function of the main control unit, control the one or more electronic parking brakes based on a signal from the wheel speed sensor to perform a slip control on the vehicle; and
   a regenerative braking unit configured to generate, based on a regeneration braking signal generated by the main control unit or the redundancy control unit, a regenerative brake force required for braking of the vehicle,
   wherein, in response to detecting no malfunction of the brake function of the main control unit, the main control unit is configured to calculate the regenerative brake force and generate and transmit, to the regenerative braking unit, the regeneration braking signal indicative of the regenerative brake force calculated by the main control unit, and
   wherein, in response to detecting the malfunction of the brake function of the main control unit, the redundancy control unit is configured to calculate the regenerative brake force and generate and transmit, to the regenerative braking unit, the regeneration braking signal indicative of the regenerative brake force calculated by the redundancy control unit.

2. The electrohydraulic brake system of claim 1, wherein the wheel speed sensor is configured to determine whether a slip occurs to the front and rear wheels and to detect rotational speeds of the front and rear wheels.

3. The electrohydraulic brake system of claim 1, wherein the redundancy control unit is further configured to determine a wheel speed difference between the front and rear wheels for the slip control by using a first wheel speed of the front wheels as a basis for determining whether a second wheel speed of the rear wheels is greater than the first wheel speed of the front wheels, and by determining whether a slip occurs.

4. The electrohydraulic brake system of claim 1, wherein the redundancy control unit is further configured to control braking of the front wheels by using the main brake assembly and braking of the rear wheels by using the electronic parking brake upon determining that the malfunction occurs to the braking function of the main control unit.

5. The electrohydraulic brake system of claim 4, wherein the redundancy control unit is configured to perform the slip control by using an anti-lock brake system function to prevent the front wheels from being locked during braking for preventing the vehicle from slipping and by using a rear wheels unlocker function on the rear wheels to keep the vehicle under the slip control.

6. An electrohydraulic brake system for a vehicle having an acceleration sensor, comprising:
- one or more main brake assemblies configured to generate a first braking force for front wheels and rear wheels of a vehicle;
- one or more electronic parking brakes configured to generate a second braking force for one of the front and rear wheels;
- a main control unit configured to control the one or more main brake assemblies; and
- a redundancy control unit configured to, in response to detecting that a malfunction has occurs to a braking function of the main control unit, control the one or more electronic parking brakes based on a signal from the acceleration sensor to perform a slip control on the vehicle; and
- a regenerative braking unit configured to generate, based on a regeneration braking signal generated by the main control unit or the redundancy control unit, a regenerative brake force required for braking of the vehicle,
- wherein, in response to detecting no malfunction of the brake function of the main control unit, the main control unit is configured to calculate the regenerative brake force and generate and transmit, to the regenerative braking unit, the regeneration braking signal indicative of the regenerative brake force calculated by the main control unit, and
- wherein, in response to detecting the malfunction of the brake function of the main control unit, the redundancy control unit is configured to calculate the regenerative brake force and generate and transmit, to the regenerative braking unit, the regeneration braking signal indicative of the regenerative brake force calculated by the redundancy control unit.

7. The electrohydraulic brake system of claim 6, wherein the acceleration sensor is configured to measure whether the vehicle is decelerated due to braking by the electronic parking brake.

8. The electrohydraulic brake system of claim 6, wherein the redundancy control unit is further configured to control first braking of the front wheels by using the main brake assembly and second braking of the rear wheels by using the electronic parking brake upon determining that the malfunction occurs to the braking function of the main control unit.

9. A method of braking a vehicle comprising (1) one or more main brake assemblies, (2) one or more electronic parking brakes, (3) a plurality of wheels, and (4) a wheel speed sensor, by using (1) a main control unit controlling the one or more main brake assemblies, (2) a redundancy control unit controlling the one or more electronic parking brake, brakes, and (3) a regenerative braking unit configured to generate, based on a regeneration braking signal generated by the main control unit or the redundancy control unit, a regenerative brake force required for braking of the vehicle, the method comprising:
- determining whether the main control unit malfunctions;
- determining whether the redundancy control unit malfunctions;
- in response to determining that the main control unit is not malfunctioning, controlling the main control unit to (1) perform a first slip control on the plurality of wheels based on a signal from the wheel speed sensor, (2) calculate the regenerative brake force, and (3) generate and transmit, to the regenerative braking unit, the regeneration braking signal indicative of the regenerative brake force calculated by the main control unit; and
- in response to determining that the main control unit is malfunctioning and the redundancy control unit is not malfunctioning, controlling the redundancy control unit to (1) perform a second slip control on the plurality of wheels of the vehicle based on the from the wheel speed sensor, (2) calculate the regenerative brake force, and (3) generate and transmit, to the regenerative braking unit, the regeneration braking signal indicative of the regenerative brake force calculated by the redundancy control unit.

10. The method of claim 9, further comprising causing the redundancy control unit to control a braking force for a plurality of rear wheels of the vehicle based on a signal from an acceleration sensor.

* * * * *